Patented Nov. 4, 1924.

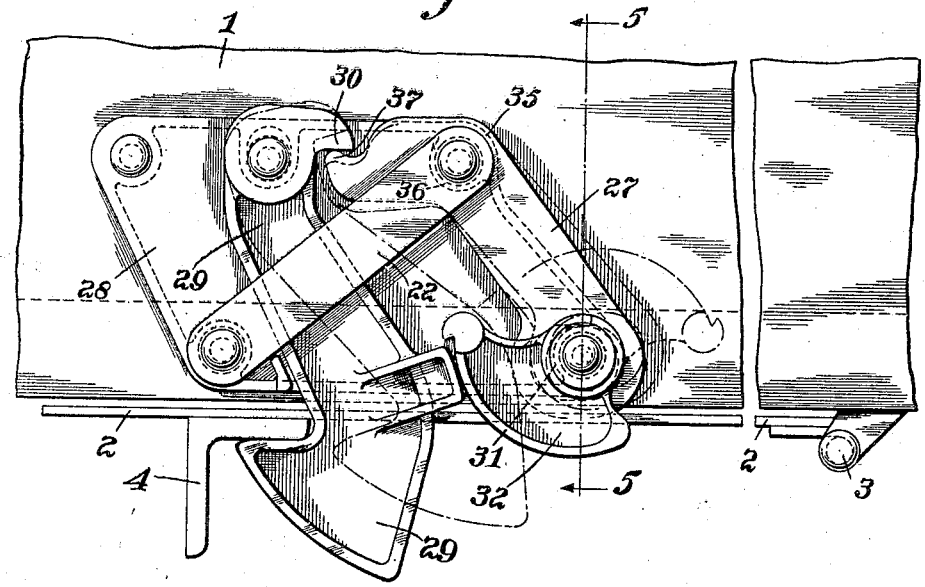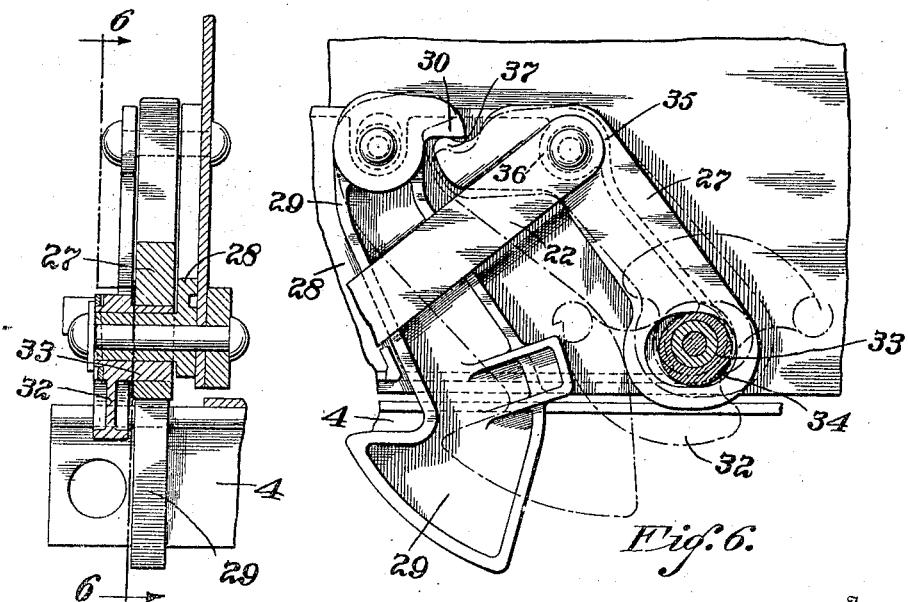

1,514,312

UNITED STATES PATENT OFFICE.

WILLIAM F. CREMEAN AND WILBUR M. BOSWORTH, OF TOLEDO, OHIO.

CAR-DOOR-LOCKING DEVICE.

Application filed March 17, 1922. Serial No. 544,432.

*To all whom it may concern:*

Be it known that we, WILLIAM F. CREMEAN and WILBUR M. BOSWORTH, citizens of the United States of America, residing at Toledo, in the county of Lucas and State of Ohio, have invented certain new and useful Improvements in Car-Door-Locking Devices, of which the following is a specification.

Our invention relates to new and useful improvements in car door locking devices and more particularly to a locking device for freight cars having drop bottom doors.

The primary object of the invention is to provide a car door supporting and locking device which may be easily assembled, is relatively cheap to construct, and which may be readily applied to the side of the car body. More specifically, it is a principal object of the invention to provide means for effectively applying to a drop bottom car door sufficient force to cause it to assume its position of final closure, it being well known that when the doors become slightly distorted or warped, or when the material carried in the car lodges along the edges of the door it is necessary, in order to force the door to its final closed position, to apply a far greater force than is required to effect the initial closing movement of the door.

A principal feature of the invention is to provide for a drop bottom car door a locking device employing a hook which is pivotally mounted on the side of the car in such manner as to be capable of a slight vertical movement which may be utilized for moving the door to its final closed position.

Another feature of the invention consists in providing a pivotally mounted door supporting hook which is capable of a slight vertical movement and which is so combined with associated parts that it will be raised slightly when forced to its locked position.

A further feature of the invention consists in constructing a door locking device with a pivotally mounted and vertically movable hook to support the door, in combination with a pivoted arm or lever and a link or crank arm for actuating the latter, the lower end of the link being rotatably mounted on an eccentrically pivoted collar carried by a rotatable dog or cam cooperating with the hook, the arrangement being such that when the dog is swung to a position for locking the hook in place, the said lever and its actuating link or crank arm will cause the hook and the door thereon supported to move upwardly to closed or locked position.

Other features of the invention residing in advantageous details of construction and particular relations of parts will hereinafter appear.

In the drawings chosen for the purpose of illustrating the invention, the scope whereof is pointed out in the claims, Figure 1 is a side elevation of a preferred embodiment of the locking device shown as associated with the side of a car and a drop bottom door, the parts of the locking device being illustrated in the locked position which they assume when the door is fully closed, and the positions assumed by the elements of the locking device for permitting the door to open being indicated in dotted lines.

Figure 4 is a view corresponding to Fig. 1 but illustrating a modified form of the invention.

Figure 5 is a sectional view on the line 5—5, Fig. 4.

Figure 6 is a sectional view on the line 6—6, Fig. 5, two positions of the locking cam being shown in dotted lines.

Figure 1:
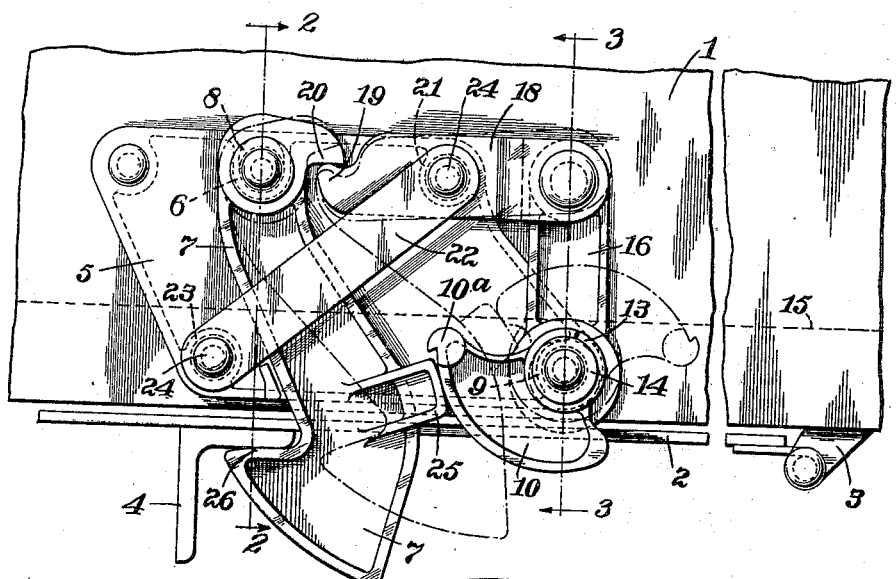
Figure 2:
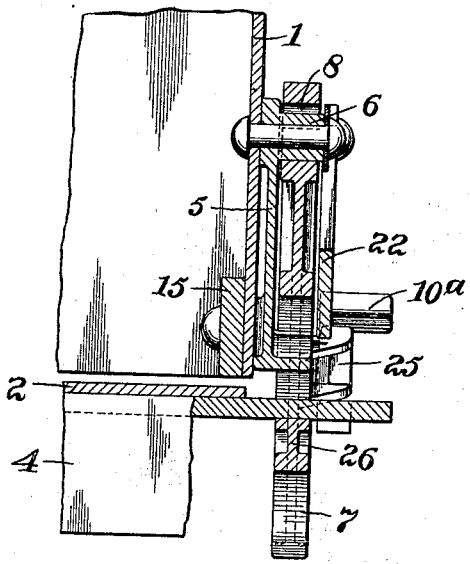
Figure 2 is a sectional view on the line 2—2, Fig. 1.
Figure 3:
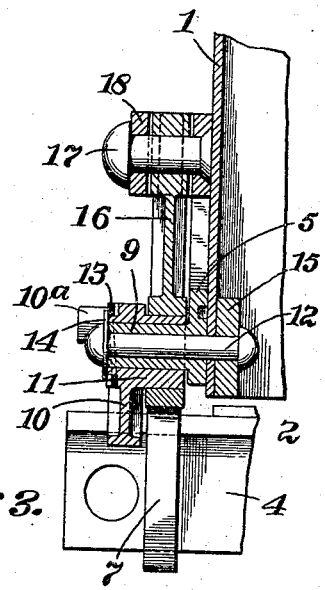
Figure 3 is a sectional view on the line 3—3, Fig. 1.

Referring particularly to Figs. 1, 2 and 3 of the drawings, 1 indicates a fragmentary portion of the side of a car and 2 is a drop bottom door hinged to a bracket 3 secured to the car body. The form of door illustrated is provided on its under side with a transversely extending angle iron 4 which preferably is continuous and arranged parallel to the outer end or edge of the door so as to provide door supporting arms on opposite sides of the car. The ends of the angle iron 4 project outwardly beyond the respective lateral edges of the door and also beyond the side of the car 1, thus affording seats for corresponding pivoted hooks mounted upon the car.

As the door locking mechanisms are the same only one of them will be described.

Bolted or riveted to the side 1 of the car above the angle iron 4 is a plate or bracket 5 which is formed near its upper edge with a boss 6. Pivotally mounted on the boss 6 is a door supporting hook 7, the opening 8 in the upper end of the hook into which the boss 6 extends being in the form of an elongated slot. The hook 7 is therefore not only adapted to swing upon the pivot boss 6 but also to move a slight distance vertically.

At its right hand lower corner the plate or bracket 5 is integrally formed with another boss 9 on which a cam or dog 10 is rotatably mounted. The dog is provided on its inner side with a hub 11 having an eccentrically disposed pivot opening for receiving the boss 9. The cam or dog 10 may be retained in assembled position on the boss 9 by means of a rivet 12 which passes through the boss and through a flat washer 14 which overlaps the outer face of the dog adjacent the boss receiving aperture therein. If desired rotation of the dog 10 under the influence of gravity may be prevented by operatively interposing a spring washer 13 between the dog and the retaining washer 14. As shown in the drawings, the rivets passing through the lower portion of the plate 5 may also extend through a reinforcing strip or bar 15 positioned on the inner face of the car side 1.

Revolubly mounted on the eccentric collar or hub 11 of the cam 10 is a link 16 whose upper end is pivotally attached to a lever 18 which cooperates with the hook 7. The lever 18 is preferably in the form of a horizontally extending arm or bar provided with a bifurcated end to which the cam actuated link 16 is pivoted by means of a rivet 17. The outer end of the arm or lever 18 is preferably fashioned with a nib 19 which extends under and is adapted to contact with a lug 20 integrally formed on the hook 7. A fulcrum point or pivot for the arm or lever 18 may advantageously be provided by forming the base plate or bracket 5 with a small perforated boss 21 for receiving a rivet 24 which passes through the lever 18. The plate 5 is also preferably provided with another small boss 23 for receiving a rivet 24, both rivets 24 serving to securely hold in place a strap 22 which overlies the hook 7 and thereby supports it against lateral movement.

Formed integral with the hook 7 and projecting rearwardly therefrom so as to extend into the path of swinging movement of the locking cam 10, is a lug or projection 25. When the dog 10 is caused to perform a counter-clockwise rotation to its locked position it engages the projection 25 upon the hook and forces and maintains the door supporting ledge of the hook 7 under the horizontal flange of the angle iron door arm 4. During this rotation of the cam 10 its eccentric hub 11 causes the link 6 to be drawn downwardly which thereby, through the pivoted lever 18, effects a raising of the hook 7 and a consequent movement of the door to fully closed position. It will be noted that when the door is in fully closed position the hook 7 is sustained upon the movable arm or lever 18; and it also will be perceived that when the dog 10 is in locked position any tendency of the hook 7 to move downwardly communicates to the locking cam a tendency to rotate in a direction bringing it more firmly into engagement with the lug 25 of the hook, thus effectively counteracting and preventing any accidental downward or door releasing movement of the hook.

It will be understood that when the dog 10 is in the position shown in dotted lines in Fig. 1, the hook 8 is permitted to drop to its lowest position, being then supported upon the stationary pivot boss 6 of the plate or bracket 5. While occupying its lower position the hook 7 may be rotated upon the pivot boss 6 as may be necessary to permit the horizontal flange of the angle iron 4 to come into supported relation with the jaw 26 of the hook so as to sustain the door temporarily in a position approaching that of final closure. The cam mechanism heretofore described affords means of applying great force to the door to move it from this temporary position to fully closed position.

For the purpose of enabling it to be conveniently rotated the locking cam 10 is preferably provided with an outwardly projecting handle or lug 10$^a$. By rotating the cam by grasping the handle or by striking this lug with a hammer or other suitable implement the dog 10 may be revolved into firm jamming engagement with the lug 25 at the back of the hook. The camming or eccentric action of the hub 11 enables the necessary lifting force to be applied to the hook 7 in a very efficient manner when the cam to which the hub 11 is secured is moved to locked position.

The functions performed by the modified embodiment of the invention illustrated in Figs. 4, 5 and 6 correspond to those performed by the locking device just described; but in the modified form the link and lever are rigidly united to form an integral crank arm or bell crank lever 27. The plate 28, which may be of substantially the same form as the plate or bracket 5 and which may be similarly secured to the car side 1 by means of rivets, has pivotally mounted upon it a hook 29 whose jaw or ledge is adapted to supportingly engage the angle iron door arm 4. As in the case of the hook heretofore described, the hook 29 is pivotally connected to the plate 28 by a pin and slot connection permitting the hook to move vertically. At its upper end the hook 29 is formed with an outwardly extending lug 30 corresponding in form and function to the similar lug upon the hook 7.

The plate or bracket 25 is provided at its lower right hand corner with a boss 31 on which the cam 32 is revolubly mounted, the cam being integrally united to an eccentric collar or hub 33 which extends into an elongated opening or slot 34 in the lower end of the crank arm 27. This crank arm is pivotally mounted as at 35 on a similar boss 36 with which the plate 28 is provided, while the outer or hook engaging end of the member 27 is formed with a nib 37 which extends under and is adapted to engage the lug 30 of the hook 29. The remaining features of construction of the form of the device illustrated in Figs. 4, 5 and 6 are similar in form and function to the corresponding parts of the preferred form of locking mechanism shown in Figs. 1, 2 and 3.

When the dog 32 is swung into engagement with the hook 29 it effects a rotation of the eccentric hub or collar 33 and the latter cooperates with the slotted end of crank arm 27 to cause the latter to execute a rotation effecting the lifting movement of the hook 29 necessary to raise the door to final closed position.

It will be seen that the locking device, in either of its forms, is positive in action, is easily operated, and may be readily applied to a car.

Many slight changes might be made without in any way departing from the spirit and scope of our invention.

What we claim as new and desire to secure by Letters Patent is:

1. A car door locking device comprising a pivotally mounted hook which is capable of a slight vertical movement, a rotatably mounted dog, and means cooperating with said dog and said hook, whereby when said dog is rotated it will force the said hook upwardly and hold it in its forwardmost position.

2. A locking device for car doors, comprising a base plate, a hook pivotally mounted on said plate and capable of a slight vertical movement about its pivotal point, a rotatable dog also pivotally mounted on said plate and adapted to hold the hook in its forwardmost position when said dog is swung forwardly, and means extending from the hook to said dog for raising said hook slightly when said dog is thrown forwardly.

3. A locking device for car doors comprising a base plate, a hook having a slot therein and mounted on said base plate, a dog provided with an eccentric hub mounted on said base plate, said dog being adapted to hold said hook in its forwardmost position when said dog is thrown forwardly, and means mounted on the hub of said dog and cooperating with said hook to elevate said hook when the said dog is rotated to its forwardmost position.

4. A locking device for drop bottom doors comprising a base plate, a hook having a slot in its upper portion and swingingly mounted on said base plate, said hook being provided with a lug on its upper portion, a dog provided with an eccentric hub, said dog being mounted on said base plate and holding said hook in its forwardmost position when said dog is in its locked position, and means pivotally mounted on said plate and mounted at one end on the hub of said dog and cooperating with the lug on the upper portion of the hook to thereby elevate the hook when said dog is swung forwardly.

5. A supporting and locking device for drop bottom doors comprising a base plate, a hook provided with a slot at its upper end and swingingly mounted on said base plate, a dog provided with an eccentric hub mounted on said base plate to the rear of said hook and holding the hook in its forwardmost position when the dog is in its locking position, and a link mounted on said hub and having an arm secured at its upper end, said hook being provided with a lug, the end of the arm passing under the lug on said hook, and said arm being adapted to raise said hook when the dog is swung to its forwardmost position.

6. In combination with a car having a drop bottom door, a bracket secured to the door and extending outwardly beyond the side of the car body, a base plate secured to the car body above the bracket on the door, a hook pivoted on the said base plate and capable of a slight vertical movement, the lower end of the hook being adapted to extend under the bracket on the door, a dog provided with an eccentric hub mounted on said base plate and contacting with a rear portion of the hook when said dog is swung forwardly, to thereby hold the hook in engagement with said bracket, and pivotally movable means carried by said base plate and mounted at one end on said hub of the dog, the upper end of the hook having a projection formed thereon, the forward end of said pivotally mounted means passing beneath the lug on said hook, and said pivotally mounted means raising said hook to tightly close the door when said dog is rotated to its locked position.

7. In combination with a car having a drop bottom door, a base plate, a hook pivotally mounted on said base plate and capable of a slight raising and lowering movement, a bracket on said door adapted to be supportingly engaged by said hook, rotatable means carried by said base plate and adapted to hold said hook in engagement with said bracket, and means operatively interposed between said hook and said rotatable means for elevating said hook to thereby move said door to closed position upon said rotatable means being swung forwardly to hold the hook in engagement with said bracket.

8. In combination with a car having a drop bottom door, a bracket on said door extending outwardly beyond the side of the car body, a base plate secured to the side of the car body, a hook swingingly mounted on said base plate and capable of a slight vertical movement, said hook adapted to engage said bracket to support the door, rotatable means mounted to the rear of the hook, and an elevating means interposed between said rotatable means and said hook, whereby when said rotatable means is operated the hook will be held against disengagement from the bracket on the door and will also be elevated to raise the door to a closed position.

9. In combination with a car having a drop bottom door, a base plate mounted on the side of the car body, an angle iron secured to the bottom of the door and extending beyond the free side of the door, a hook swingingly mounted on said base plate, and capable of a slight vertical movement, the lower end of said hook being adapted to engage with said angle iron to support the door, a rotatable means mounted to the rear of said hook and adapted to jam said hook in its forward position when said rotatable means is swung forwardly, and movable means cooperating with the upper end of the hook and with the said rotatable means for lifting the hook upwardly when said rotatable means is swung forwardly and for permitting a lowering movement of the hook when said rotatable means is swung rearwardly.

10. In combination with a car having a drop bottom door, an angle iron secured to the bottom of the door and extending outwardly beyond the side of the car body, a base plate, a hook swingingly mounted on said base plate and capable of a slight vertical movement, a lug formed on the upper end of said hook, an extension formed on the rear edge of the hook, a concentrically mounted dog, an eccentric hub on said dog, a link mounted on said hub and an arm secured to the upper end of said link, said arm being pivotally supported on said plate, the outer end of said arm extending beneath the lug formed on the upper end of said hook, and said arm being adapted to raise said hook when said dog is swung forwardly to hold the hook in engagement with the bracket on said door.

11. In combination with a car body having a drop bottom door, an angle iron secured to said door and extending beyond the free edge thereof, a hook swingingly mounted on the side of the car and adapted to engage said angle iron, rotatable means for engaging the rear of said hook to lock the hook in its forwardmost position, and means extending from said hook to said rotatable means and operated through movement of the latter for raising the hook and thereby supporting the door in a closed position.

12. A car door locking device including in combination with a swinging door, a pivoted member for supporting said door, said pivoted member being adapted to be raised with respect to its pivot point, a swinging member adapted to maintain the pivoted member in supporting relationship with said door, and means operatively interposed between said pivoted member and said swinging member for raising said pivoted member while the latter is maintained by said swinging member in door supporting relationship with said door.

13. In combination with a car having a hinged door adapted to swing to open position under the influence of gravity, a movable member adapted to support said door in a closed position and also in a partially closed position, means for supporting said movable member in a position corresponding to the partially closed position of said door, and means for supporting said movable member in a position corresponding to the closed position of said door, said last named means serving to support said movable member independently of the means by which it is supported when the door is in partially closed position.

14. In combination with a car having a hinged door adapted to swing to open position under the influence of gravity, a pivoted hook adapted to support said door in a closed position and also in a partially closed position, means forming a pivotal support for said hook when the latter is in a position corresponding to the partially closed position of the door, and means for supporting said hook when the latter is in a position corresponding to the closed position of the door, said last named means serving to support said hook independently of said pivotal support.

15. In combination with a car having a hinged door adapted to swing to open position under the influence of gravity, movable means adapted to support said door in a closed position and also in a partially closed position, means for supporting said movable means in a position enabling it to support the door in partially closed position, and means for supporting said movable means in a position enabling it to support the door in closed position, each of said means for supporting said movable means serving independently to support said movable means.

16. In combination with a car having a hinged door adapted to swing to open position under the influence of gravity, a movable hook adapted to support said door in a closed position and also in a partially closed position, means for supporting said hook in a position enabling it to support the door in partially closed position, and means for supporting said hook in a position enabling it to support the door in closed position, said last named means serving to relieve said first named means from the load imposed on said hook when the latter supports the door in partially closed position.

17. In combination with a car having a hinged door adapted to swing to open position under the influence of gravity, a movable hook adapted to support said door in a plurality of positions, and a plurality of means either of which is adapted to support said hook independently of the other, said hook being movable so as to be adapted to be supported by either of said means.

18. In combination with a car having a hinged door adapted to swing to open position under the influence of gravity, a pivoted hook adapted to support said door in a plurality of positions, a pivotal support for said hook, said hook and said pivotal support having a pin and slot connection whereby said hook may be raised to effect a closing movement of said door, and means for maintaining said hook in raised position.

19. In combination with a car having a hinged door adapted to swing to open position under the influence of gravity, a vertically movable swinging hook adapted to support said door in closed position, and movable means adapted to engage with and disengage from said hook for maintaining the latter in a position corresponding to the closed position of the door, downward movement of said hook when the latter is engaged by said means and the door is supported in closed position being adapted to induce a movement of said means increasing its engaging pressure upon said hook.

20. In combination with a car having a hinged door adapted to swing to open position under the influence of gravity, a pivoted hook adapted to support said door in a plurality of positions, a pivotal support for said hook, said hook and said pivotal support having a pin and slot connection whereby said hook may be raised to effect a closing movement of said door, and lever means adapted to engage with and disengage from said hook for raising the latter to effect a closing movement of the door.

21. In combination with a car having a hinged door adapted to swing to open position under the influence of gravity, of door supporting means adapted to be swung into and out of supporting relation with said door, a base plate secured to said car, said door supporting means being movably mounted on said plate, and means for moving said door from a partially closed to a fully closed position while said door is in engagement with said door supporting means, said means for moving said door involving a cam member movably mounted on said plate and adapted to engage said door supporting means, and handle means whereby said cam member may be actuated to cause said door supporting means to force said door to closed position.

In testimony whereof we affix our signatures.

WILLIAM F. CREMEAN.
WILBUR M. BOSWORTH.